Patented Apr. 29, 1924.

1,492,094

UNITED STATES PATENT OFFICE.

ELIAS BIELOUSS, OF WASHINGTON, DISTRICT OF COLUMBIA, ASSIGNOR OF ONE-HALF TO THE INSTITUTE OF INDUSTRIAL RESEARCH, INC., OF WASHINGTON, DISTRICT OF COLUMBIA, A CORPORATION OF THE DISTRICT OF COLUMBIA, ONE-FOURTH TO WILLIS A. GIBBONS AND ONE-FOURTH TO JAMES B. L. ORME, BOTH OF NEW YORK, N. Y.

PROCESS FOR THE TREATMENT OF AROMATIC MATERIALS AND PRODUCTS RESULTING THEREFROM.

No Drawing.   Application filed April 19, 1919. Serial No. 291,219.

*To all whom it may concern:*

Be it known that I, ELIAS BIELOUSS, a citizen of Russia, residing at Washington, in the District of Columbia, have invented certain new and useful Improvements in Processes for the Treatment of Aromatic Materials and Products Resulting Therefrom, of which the following is a specification.

This invention relates to processes for the treatment of aromatic materials such as high explosives produced from toluol, benzene and the like and products resulting therefrom. It is more particularly directed to processes for the conversion of aromatic materials, including such high explosives, to produce reduced, hydrolised and other products with and without the combination of other substances therewith and products resulting therefrom.

This application is a continuation in part of my co-pending application Ser. No. 269936, filed January 6, 1919. It is pointed out that the recent military activity has lowered the cost of production of toluol and similar substances and has also provided large stores of high explosive materials such as trinitrotoluol, tetryl, dinitrobenzene and the like as set forth in my co-pending application mentioned.

One object of the present invention accordingly is to provide a safe, inexpensive and efficient process for converting material of the kind mentioned into reduced, hydrolised and other materials with or without the addition of other substances.

Another object of the invention is to provide a quick and inexpensive method of dyeing textile materials utilizing such converted materials.

Another object of the invention is to provide a simple, efficient process of reduction, giving relatively high yields of the reduced product rapidly and without the employment of skilled labor.

Another object of the invention is to provide new compositions of matter through the process herein evolved, rendering available materials hitherto unavailable through their cost, and through the utilization of processes for the production of raw materials and completed explosives perfected during the course of the recent military activity.

It will be recognized that when advantage is taken of the low price of toluene, benzene, or the like and such substances are used as starting points for the production of materials, which, when the process is directed to that end, possess an explosive character, such materials may be looked upon as reaction products of a stage in the process of producing substances occupying a position between the toluene, benzene, and the like, and the various products as hereinafter set forth.

The invention accordingly consists of a process and steps therein involved which comprise reducing a product of toluol; for example, trinitrotoluol or the like, in the presence of iron and an acid, preferably one in which the reduced product is soluble, recovering the reduced product and utilizing the reduced product as such or converting it into other useful substances.

More specifically the invention comprises the reduction by iron producing iron hydrate of an explosive such as trinitrotoluol having reducible radicals, or picric acid or the like, with the introduction of hydrogen into the groups, such as the nitro groups, therewith associated, or the elimination of such a group and its substitution by hydrogen; the utilization of the converted products as such or their further treatment by hydrolysis or otherwise into products containing one or more hydroxyl groups.

As a specific example of one embodiment of the process, 230 kilos of trinitrotoluol are slowly mixed with 700 kilos of iron powder or small iron turnings in the presence of 800 liters of water and 20 liters of hydrochloric acid.

Carrying out the reaction, the acidified water is heated to approximately 60° C. with the iron and trinitrotoluol is added in small portions from time to time.

The reaction is preferably carried out in an iron vessel and stirring is practiced continually. The temperature is maintained at aproximately 60 to 80° C.

When the reaction is complete, the contents of the vessel, containing iron and ferrous-hydroxid in suspension and the reduced substance in solution, is filtered and the residue washed with approximately 1700 liters of water. The reaction which here takes place is apparently as follows:

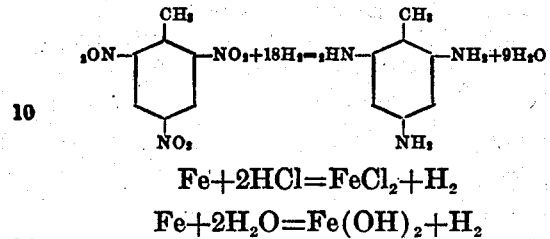

$$Fe + 2HCl = FeCl_2 + H_2$$

$$Fe + 2H_2O = Fe(OH)_2 + H_2$$

(In presence of $FeCl_2$).

The product triamidotoluol is water soluble. The reduction here taking place is one in which, as indicated in the equation above, iron is transferred from iron to ferrous-hydrate, liberating hydrogen and providing in the bath, a gradually increasing quantity of ferrous-hydrate and a decreasing quantity of iron to the end of the reaction.

It will be noted that a small quantity of iron chloride is formed as indicated in the equation below. The expression "small quantity" as herein used is intended to represent a quantity considerably less than the stoichiometrical amount of hydrochloric acid and is preferably such that the solution obtained at the end of the reaction is substantially free from iron chloride resulting from the reaction with hydrochloric acid. It appears that trinitrotoluene is a relatively strong oxidizing agent and is apt to oxidize triaminotoluene formed by the reaction causing the mass to gum and the liberation of ammonia. By maintaining the temperature range and adding the trinitrotoluene as indicated this gumming which decreases the yield of triaminotoluene appreciably is substantially avoided.

A portion of this solution when evaporated to dryness provided a deep brown-red, substantially amorphous mass which had no definite melting point. In identifying the presence of triaminotoluene, as indicated in the above reaction however, use was made of standard sodium hydrate. Theoretically, hydrochloric acid should combine with the three amido groups to provide the triaminotoluene-trihydrochloride; thus—

The trihydrochloride was obtained by evaporation of the material with hydrochloric acid in excess and removing the excess by heating. The amount of sodium hydrate absorbed by titration showed that there was present approximately 89% of the theoretical yield of triaminotoluene from trinitrotoluene. This percentage yield was checked by the production of a dye of the chrysoidine type.

The chrysoidine reaction includes the production of triaminotoluene-azobenzene. It is carried out by the diazotization of aniline. This solution is made up to contain a certain quantity of azobenzene per unit volume and the quantity of the known volume of the dissolved reduced material is titrated with the standardized azobenzene. Carrying out this reaction, the yield indicated by the sodium hydrate titration has been checked.

It has been found that the triaminotoluene produced as above indicated, serves as a direct dye for textile on materials such as cotton, wool and silk. 5 parts of wool immersed in 200 parts per volume of triaminotoluene solution containing 1% triaminotoluene based on the weight of the wool in the presence of Glauber's salt and sulphuric acid, and dyed at a boiling temperature until practical exhaustion of the bath, produced a light brown color on the wool. The wool was rinsed and placed in a 3% copper sulphate solution for half an hour, the color produced being a slate-brown, fast to light washing and soaping. Any desired method of oxidation may be employed.

In the dyeing of silk, 5 parts of silk are immersed in 200 cc. of triaminotoluene solution containing 2% triaminotoluene, based on the weight of the fiber. The solution employed contained "spent liquor" and acetic acid. The material was maintained at 80° C. approximately, until the bath was practically exhausted. The material was taken from the bath and rinsed and immersed in a bath of copper sulphate solution (3%), for approximately half an hour. The resulting color was a grayish yellow.

Unmordanted cotton may be dyed from a similar bath to that employed for wool dyeing and gives a similar color. The color may vary from a light slate brown to a deep rich brown according to the quantity of triaminotoluene in the dye bath.

It will readily be understood although the production of triaminotoluene by iron has been described, various other reduction products may also be formed; for example, the monoaminodinitrotoluene and diamino-mononitrotoluene. In carrying out these reactions, the quantity of iron is proportionately reduced and in making additions of iron and trinitrotoluene, it is arranged that during the entire reaction the trinitrotoluene shall be in excess of the metallic iron present, calculated for the production of monoaminodinitrotoluene or diaminonitrotoluene.

If hydrochloric acid is added to the solution of the triaminotoluene to saturate the amido groups and the material so formed is hydrolised either by boiling with water or by the addition of caustic alkali, methyl- phlorglucine and intermediate products may be formed. The reaction here taking place is as follows:

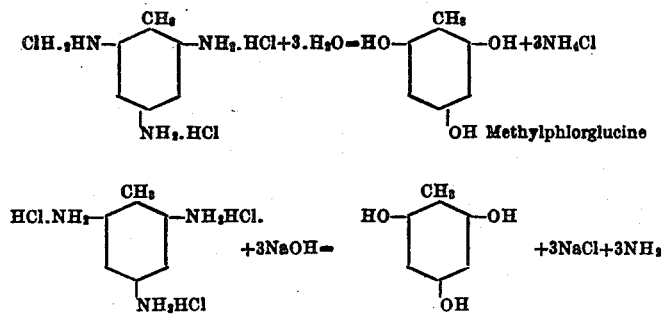

The process employing water requires protracted boiling for hydrolysis, while the process employing sodium hydroxide may be effected in a relatively short time. Both processes accumulate salts from which methylphlorglucine, which is extremely soluble in water and provides a deep straw-colored solution, can be extracted by treatment with a suitable solvent such as amyl alcohol to free it from such accumulated salts. To effect purification the product either in the presence of water or dried is extracted with amyl alcohol and precipitated by a material such as xylol. By conducting the process of purification through a series of recrystallizations, an extremely pure material may be obtained. It has been found that the products of the reaction by hydrolysis with water and caustic alkali are substantially identical in their properties. Methylphlorglucine so prepared may be utilized in various ways as set forth in my co-pending applications, Ser. No. 291,220 filed April 19, 1919 and Ser. No. 291,221 filed April 19, 1919.

It will be understood that I do not intend to limit myself to the specific embodiment of the invention as set forth except as indicated in the appended claims.

Having thus described my invention, I claim:—

1. A process for making triaminotoluene which consists in adding successive small quantities of trinitrotoluene to a mixture of iron-powder and water containing a small quantity of iron chloride, allowing the reaction for the reduction of the trinitrotoluene to proceed, maintaining the temperature at a point to prevent gumming of the mass, filtering the solution containing the reaction product, and recovering triaminotoluene from the filtrate.

2. A process for making triaminotoluene which consists in adding successive small quantities of trinitrotoluene to a mixture of iron and water containing a small quantity of iron chloride, allowing the reaction for the reduction of trinitrotoluene to proceed, maintaining the temperature approximately within the range 60–80° C., filtering the mass on completion of reaction, and recovering triaminotoluene from the filtrate.

In testimony whereof I affix my signature.

ELIAS BIELOUSS.